(12) United States Patent
Horton et al.

(10) Patent No.: US 6,638,344 B2
(45) Date of Patent: Oct. 28, 2003

(54) PLENUM PULSED FILTER VENT

(75) Inventors: R. James Horton, Rochester, MN (US); James D. Ellis, Edina, MN (US)

(73) Assignee: McNeilus Truck and Manufacturing, Inc., Dodge Center, MN (US)

( * ) Notice: Subject to any disclaimer, the term of this patent is extended or adjusted under 35 U.S.C. 154(b) by 109 days.

(21) Appl. No.: 09/952,363

(22) Filed: Sep. 11, 2001

(65) Prior Publication Data

US 2003/0047075 A1 Mar. 13, 2003

(51) Int. Cl.$^7$ ................................................ B01D 46/00
(52) U.S. Cl. ............................. 95/280; 95/278; 95/279; 55/283; 55/302; 366/8; 366/18; 366/26; 366/30
(58) Field of Search ................... 55/283, 302; 95/278, 95/280, 279; 366/8, 18, 26, 30

(56) References Cited

U.S. PATENT DOCUMENTS

| | | |
|---|---|---|
| 4,427,422 A | 1/1984 | Niederer |
| 4,584,022 A | 4/1986 | Cohen |
| 5,121,989 A | 6/1992 | Horton et al. |
| 5,203,628 A | 4/1993 | Hamm |
| 5,518,513 A | 5/1996 | Iwanaga et al. |
| 5,601,626 A | 2/1997 | Hori et al. |
| 6,036,751 A * | 3/2000 | Ribardi et al. ................ 95/280 |
| 6,290,737 B1 * | 9/2001 | Lehner ........................ 55/302 |
| 6,302,931 B1 * | 10/2001 | Min ............................. 55/302 |
| 6,309,447 B1 * | 10/2001 | Felix ........................... 95/280 |
| 6,319,295 B1 * | 11/2001 | Tojner ......................... 55/302 |
| 6,350,290 B1 * | 2/2002 | Nadeau ....................... 55/302 |

* cited by examiner

Primary Examiner—Duane Smith
Assistant Examiner—Minh-Chau T. Pham
(74) Attorney, Agent, or Firm—Nikolai & Mersereau, P.A.; C. G. Mersereau

(57) ABSTRACT

A filter vent system and method for separating entrained airborne particulate matter from the conveying fluid is disclosed, particularly as it relates to filling a storage vessel. The filter system employs a simplified, yet more efficient filter cleaning arrangement, in which the entire clean air plenum on the downstream side of a filter array of one or more filter units is periodically pulsed with a large burst or pulse of relatively high pressure air from a single source which rapidly raises the plenum pressure to, in turn, produce a temporary pulsed flow reversal in the filter units which blasts through the filter pores to displace particulate matter collected on the upstream side of all of the filter units alike thereby cleaning or re-generating the filter surfaces.

25 Claims, 8 Drawing Sheets

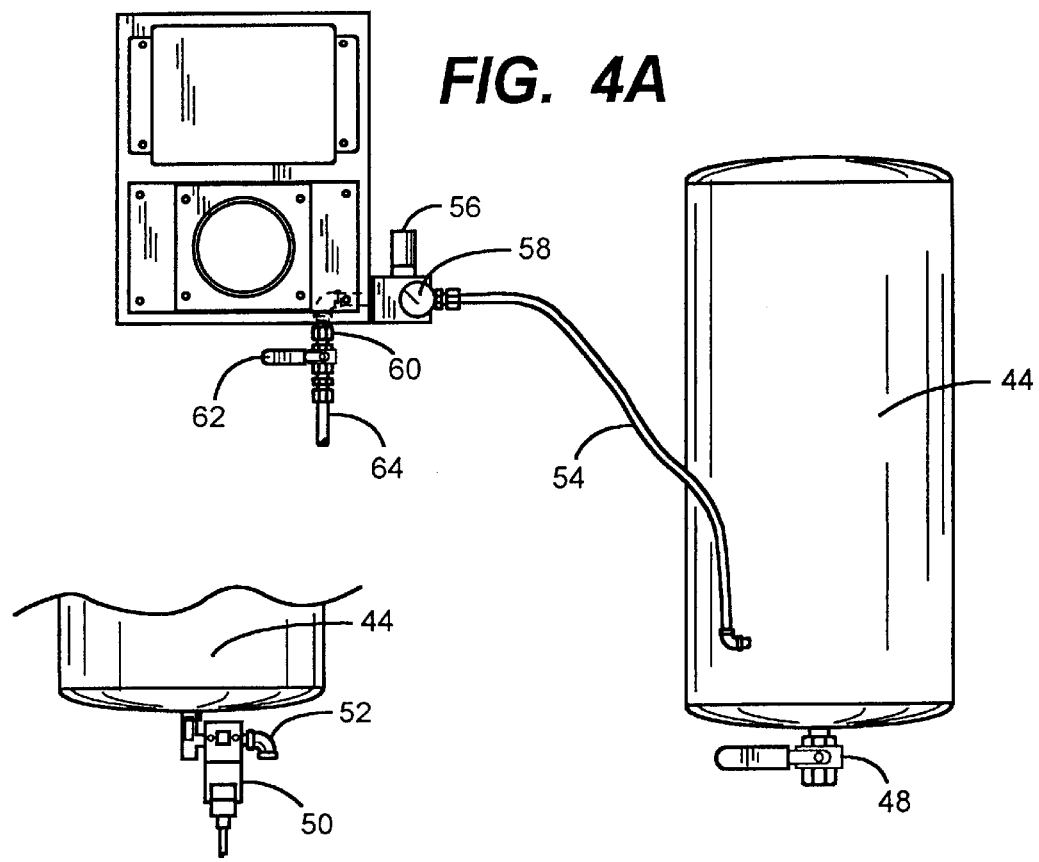
FIG. 4A
FIG. 4B
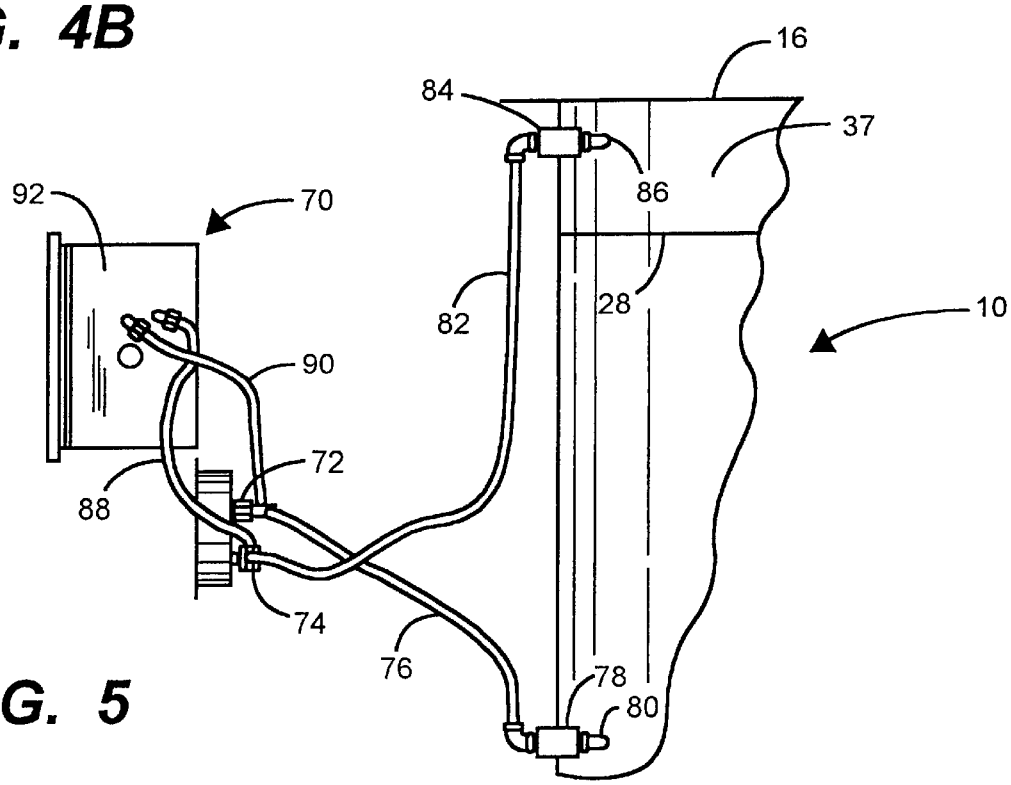
FIG. 5

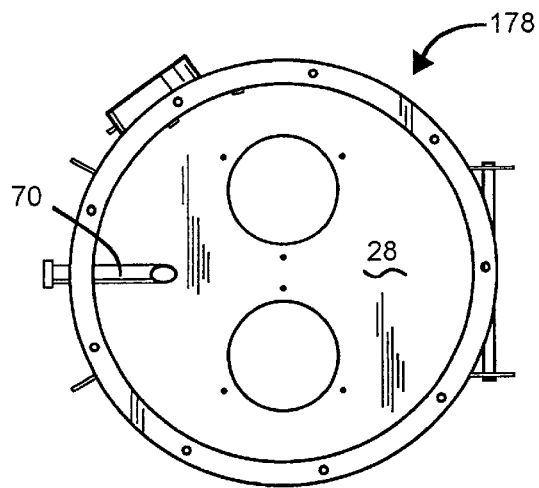 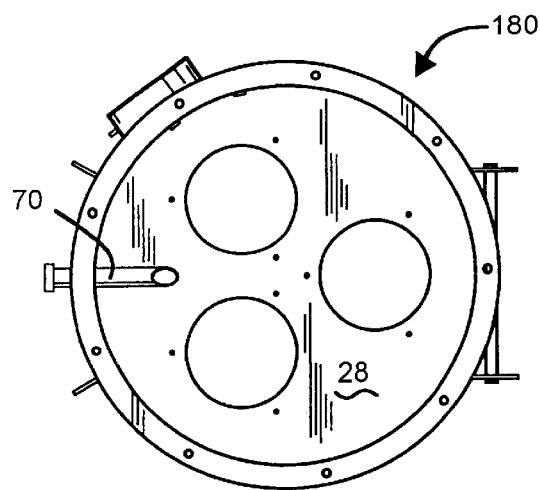
FIG. 11A  FIG. 11B
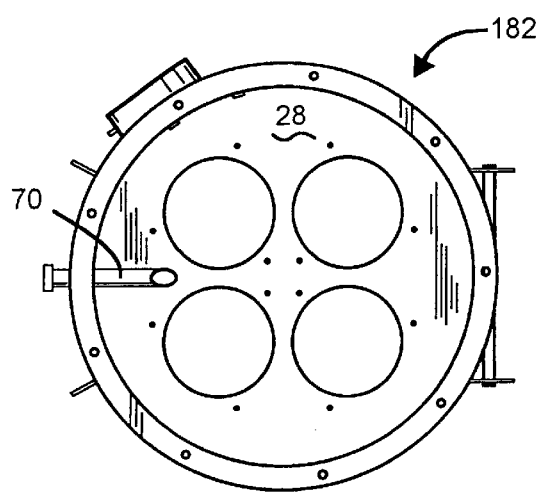 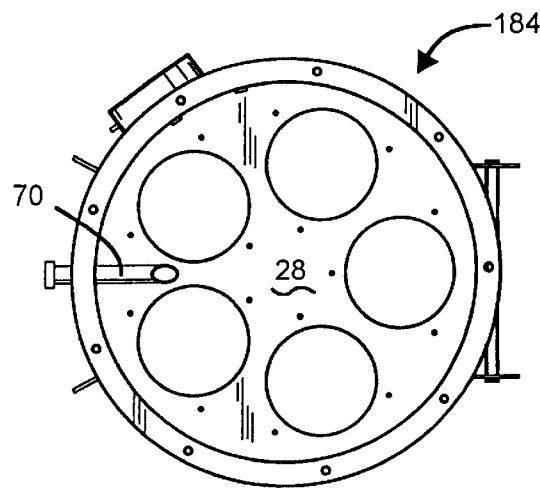
FIG. 11C  FIG. 11D

PLENUM PULSED FILTER VENT

BACKGROUND OF THE INVENTION

I. Field of the Invention

The present invention is directed generally to dust filtration systems for separating entrained particulate material from a conveying atmosphere or other gaseous fluid escaping a vessel. More particularly, the invention is directed to an improved plenum pulsed filter vent system for use in association with cement silos or cement batching vessels associated with transportable or stationary concrete batching plants or other containers or vessels subject to the generation of relatively large amounts of dust or other particulate matter internally during use.

II. Related Art

Plants for the storage and blending of the ingredients of concrete, particularly Portland cement, present a prime example of an application for the plenum pulsed filter vent system of the invention. Permanent plants for preparing batches of concrete, by mixing stone, sand, Portland cement and water, have long been used for pre-mixing materials in a weigh batching vessel prior to transferring them to transit carriers, including transit concrete mixer trucks, for delivery to job sites for use. Mixed concrete, of course, is quite heavy and has a very limited open time, making it difficult to transport over long distances from permanent mixing plant installations to remote job sites, such as found in highway construction or the building of other facilities requiring large amounts of concrete.

This situation has been alleviated by the development of transportable concrete batching systems which are capable of being moved over highways to be set up close to the point of then current use. These systems are knock-down or readily disassembled units which fold and unfold on themselves to a certain degree for transport and installation at a desired batching site. The required components of the mix, which have no limited shelf life, can then be transported to the batching facility over longer distances as needed and loaded into containers associated with the portable batching plant for later dispensing and/or mixing in the desired proportions as truck-load batches in a weigh batching vessel.

One example of such a transportable concrete batching apparatus is illustrated and described in U.S. Pat. No. 5,121,989 assigned to the same assignee as the present application. That patent is deemed incorporated herein by reference for any purpose.

A main ingredient in any case, of course, is Portland cement and the containers include a relatively large cement storage silo. Portland cement is a finely divided particulate material which produces a rather large amount of fine airborne dust during the charging operation when the silo or weigh batching vessel is refilled. This necessitates the provision of a filter vent system associated with the venting of air displaced from the cement silo, particularly during loading operations when almost the entire volume is vented as the silo is recharged. The same is true in the loading of dry ingredients including Portland cement into a batching vessel.

The large volume of airborne dust generated within the cement-containing vessels, particularly during filling operations, makes it important that the vent filters in these facilities deal with and/or prevent the escape of rather large amounts of fine entrained airborne particulate matter. This material encounters and quickly covers upstream filter surfaces and clogging of the filters is a persistent problem. Dust collection systems associated with cement silos; for example, typically include an open-bottomed chamber provided with a top panel from which one or more substantially vertically positioned hollow filter cartridge elements are mounted. The outside or upstream side of each filter element is exposed to the silo interior volume and the inside or downstream side is exposed to a clean air plenum which connects to the vent opening. In this manner, air escaping from the cement silo must traverse a cartridge filter element prior to escaping from a vent in the clean air plenum above the filter system. In order to maintain air flow through the filter system, it is necessary to provide a system to repeatedly clean or unclog the filter cartridges during loading of the silo when large amounts of air are being displaced.

Systems periodically injecting pulses of air, have been used in the past to clean the filters. These systems have relied on multiple diaphragm valves, pulse pipes and nozzles for cleaning. In such systems, a nozzle is located so as to blast air locally into an adjacent filter cartridge. This requires that a separate nozzle be provided for every cartridge or group of cartridges. Another drawback with such systems is that if the nozzles are not located at the correct distance above the filter, air from the pulse will not enter the filter correctly and the filter will not be adequately cleaned. For example, if the nozzles are located too close to the filter opening (too low), the pulse will affect cleaning only in the lower part of the filter and the top of the filter will not adequately be cleaned. If, on the other hand, the nozzles are located too far above the filters, the full force of the pulses will not enter the filters at all and the bottom of the filters will not be adequately cleaned.

In addition, the height requirement of many present pulse, pipe and nozzle filter cleaning systems is so great that maintenance personnel must climb a ladder to get to the top of the filter vent to load and unload the cartridges. This may present a safety concern inasmuch as filter vents are on top of silos that may be as high as 60 feet or more above the ground. Some of these systems are provided with a side entry to be utilized to replace the cartridges. In these designs, because the venting system is mounted in a rather large open-bottom plenum on the top of the silo and since maintenance personnel must reach into or enter the vent filtering system to change cartridges, OSHA enclosed space rules apply. Maintenance personnel therefore may be required to work in pairs and wear special body harnesses or other safety gear to comply with OSHA rules when changing cartridges. This, of course, represents added cost and results in an undesirable situation.

There clearly remains a need to provide a plenum filter vent system which assures rapid periodic cleaning of the entire filter cartridges and which, at the same time, includes a construction design which facilitates the changing of the cartridges when this operation is necessary.

SUMMARY OF THE INVENTION

The present invention provides a filter vent system and method for separating entrained airborne particulate matter from the conveying fluid particularly as it relates to filling a storage vessel of interest. The filter system employs a simplified, yet more efficient filter cleaning arrangement, in which the entire clean air plenum on the downstream side of a filter array is periodically pulsed with a large burst or pulse of relatively high pressure air from a single source which rapidly raises the plenum pressure to, in turn, produce a temporary pulsed flow reversal in the filter units which blasts through the filter pores to displace particulate matter collected on the upstream side of all of the filter units alike thereby cleaning or re-generating the filter surfaces.

This plenum pulsing operation is repeated on a predetermined timed basis during the vessel charging operation and for a scheduled time thereafter. Generally, but not by way of limitation, pulse air is supplied at a pressure ranging from about 60 to 100 PSI and preferably at or above 75 PSI. Pulse duration may be varied as desired but a range of from about 50 to about 150 ms and preferably 80 to 100 ms has proved effective. The interval between pulses may also be varied but arranged between about 60 and 180 seconds is generally used with 120 seconds being an average time. The volume of pulsed air or size of the pulse supply pipe or the like will vary with plenum chamber size and number of elements.

A pressure measurement and switch system for measuring the pressure drop across the filter units and operating a switch or other device based on pressure loss can also be used to provide data or control the operation of the plenum pulsing system. In addition, an exhaust blower may be provided to assist in exhausting the clean air plenum of a vessel being charged rapidly with solid material such as Portland cement. As indicated, Plenum and filter volume, together with pulse pipe diameter and storage vessel size considerations enter into the determination of optimum pulse parameters for any particular system.

BRIEF DESCRIPTION OF THE DRAWINGS

In the drawings wherein like numerals are utilized to depict like parts throughout the same:

FIGS. 4A and 4B show a plenum air pulsing unit as used in FIGS. 1–3;

FIG. 5 depicts a pressure switch device for use as an alternate vent pulse actuating system;

FIGS. 11A–11D depict a variety of optional filter arrangements or configurations.

DETAILED DESCRIPTION

The filter vent system of the present invention will be described with particular reference to vessels for storing and dispensing or batching Portland cement utilized in the production of concrete. That material is quite finely divided and easily entrained as airborne particulate matter particularly during loading of a Portland cement storage or weigh batching vessel. The embodiments described in the detailed description are meant to be examples of the application of the invention and are not meant to limit the scope of the invention in any manner. Other applications of the principles of the invention will become apparent to those skilled in the art as the explanation proceeds.

Figure 1:
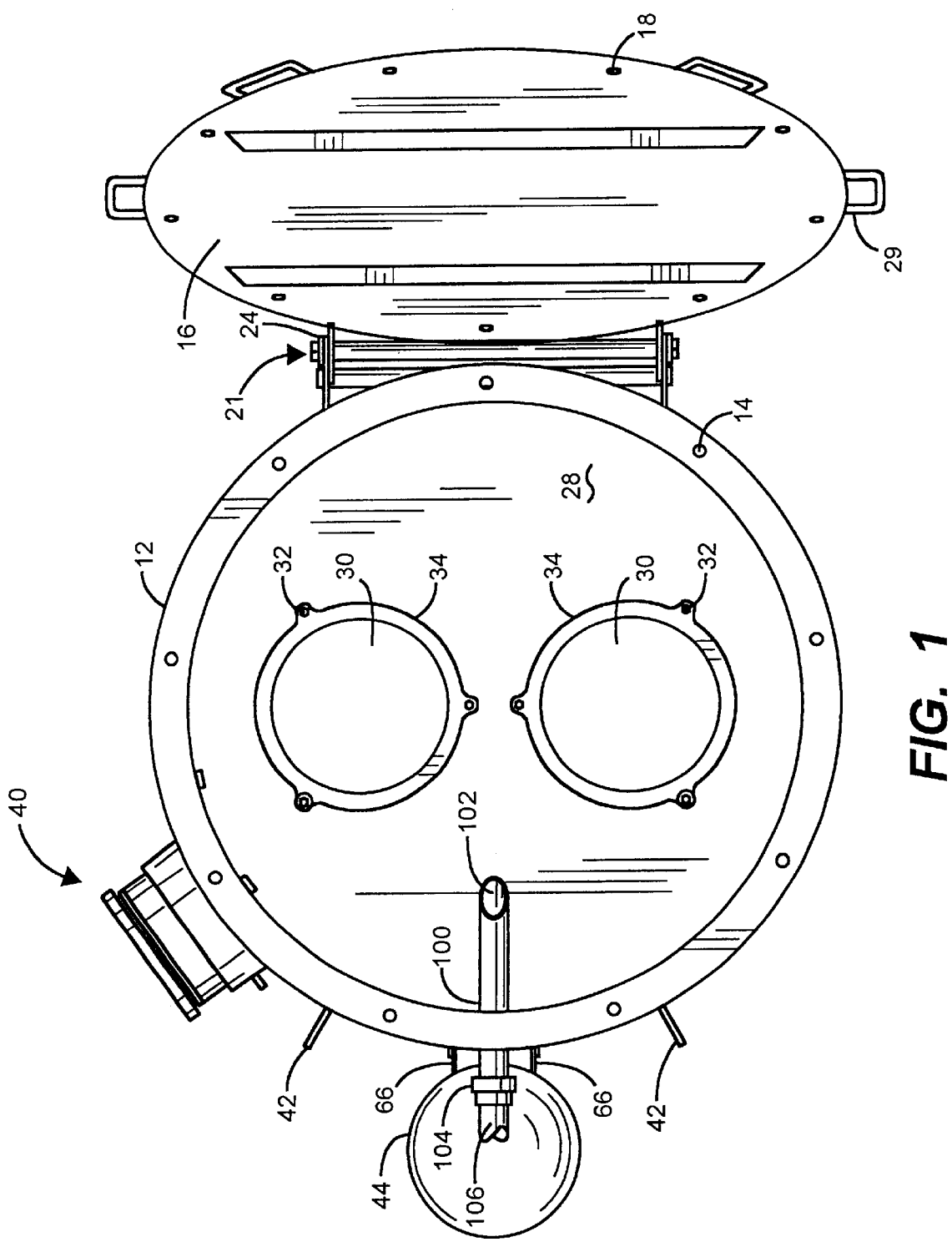
FIG. 1 is a top view with access door opened of a filter vent system or module in accordance with the invention employing a pair of cartridge filter elements.
Figure 2:
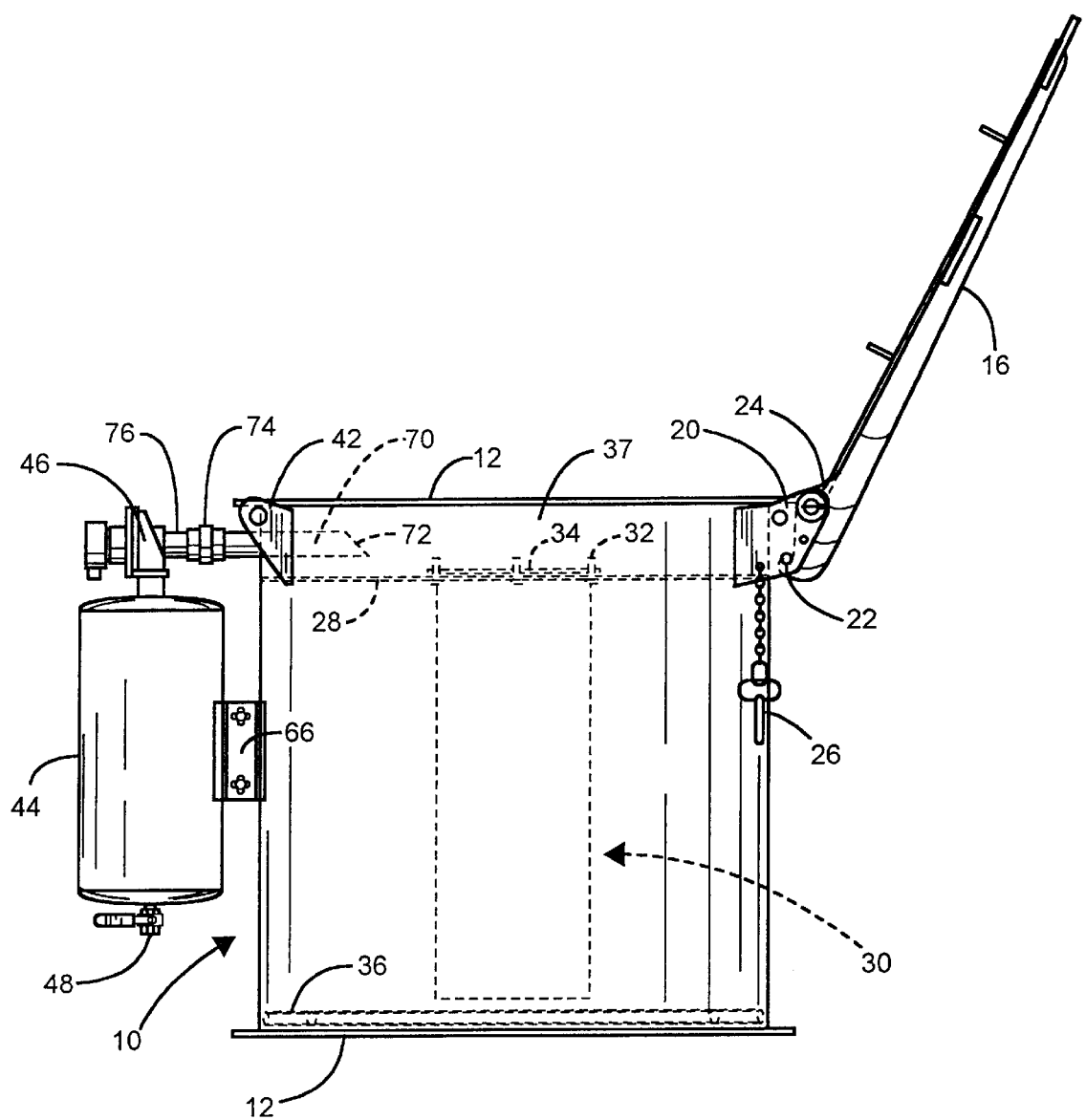
FIG. 2 is a side elevational view of the filter vent module of FIG. 1.
Figure 3:
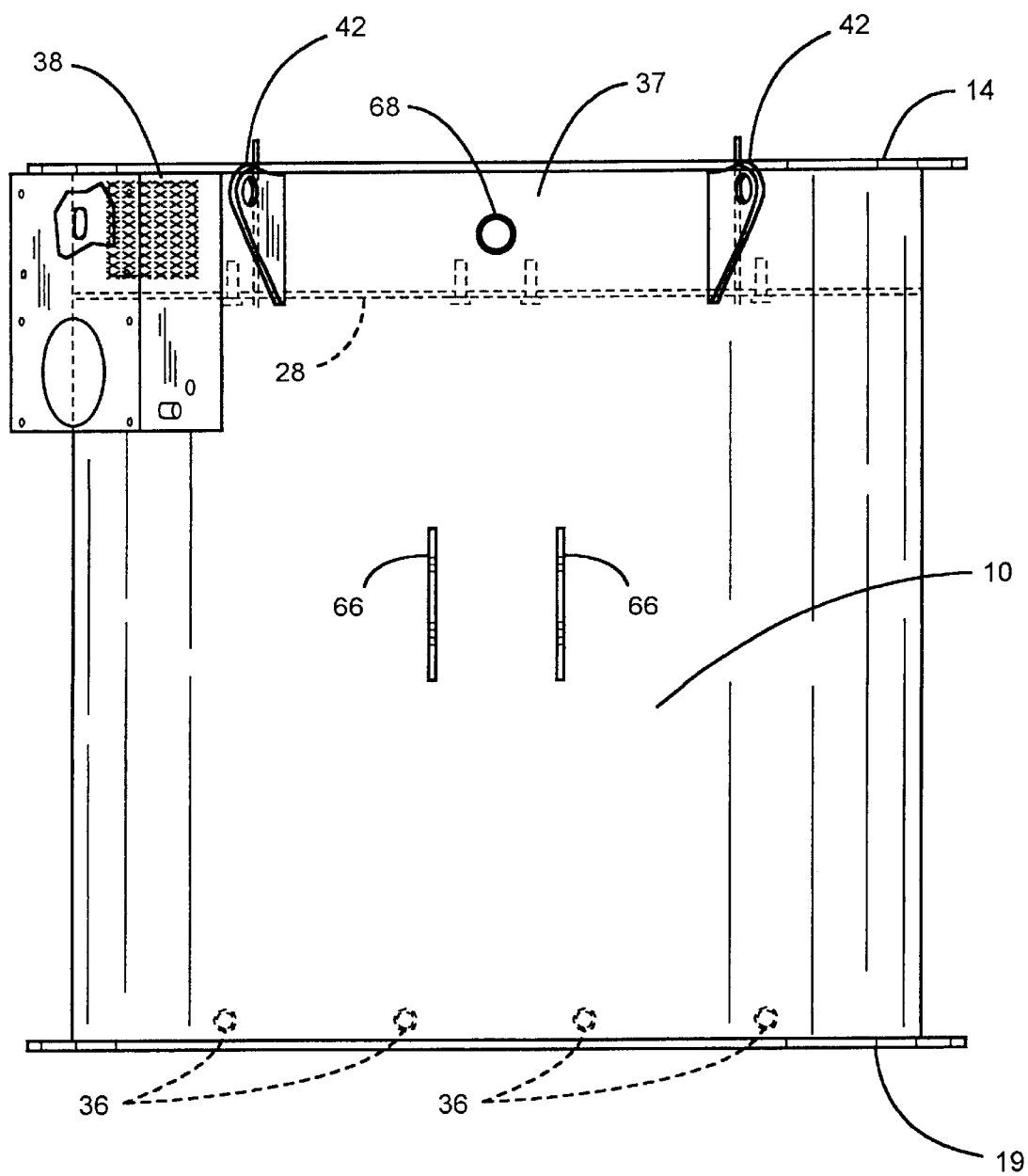
FIG. 3 is a front elevational view with the cover and plenum pulsing unit removed of the filter vent system.

FIGS. 1–3 depict top and side views of a filter vent arrangement in accordance with the invention. The system includes a cylindrical vessel section 10 in the form of a filtration zone structure having an upper flange 12 which contains a pattern of bolt holes 14 for bolting shut a hinged cover panel or access door 16 through matching holes 18. Likewise, a lower flange 19 is provided for attaching the entire filtration zone structure to a matching flange on the top of a storage vessel for fine particulate matter such as a Portland cement silo. The hinged lid 16 is provided with a pipe hinge 21 about which the cover panel 16 swivels in opening and closing. A pair of flange members 20 fixed to the side of the filtration zone structure 10 support the pipe hinge 21 and also contain a pair of holes 22 (FIG. 2) which align with holes in hinge members 24 attached to the cover 16 such that when the cover is in a fully open position, these holes align and a locking hinge pin 26 can be utilized in conjunction with the openings 22 to maintain the cover locked in an open position. This prevents the cover from being blown shut when work is being performed requiring the plenum top of the structure 10 to be open. Once unbolted, the access door 16 can easily be lifted and swung open by hand using handles 29.

The cylindrical filtration zone 10 is further divided near the top by a generally horizontal partition member 28 which is provided with a series of openings for containing hollow filter elements as at 30 which are suspended from the partition 28 and fixed in place as by hex bolts 32 and cartridge holders 34 fitting over the hex bolts 23 (FIG. 1). A bottom structure network including a series of spaced parallel cross pipes 36 are also provided in the bottom of the filtration zone structure 10 to retain any filter elements that might accidentally fall through one of the openings in the partition 28. The partition 28 and the lid 16, then, define a vent plenum chamber 37 separated from the main filtration chamber 39 which is open to the main storage portion of the vessel.

A vent opening with screen is shown at 38 (FIG. 3) and a junction box containing a conventional control board (not shown) is shown generally by 40. A pair of spaced lifting eyes are attached to the section 10 at 42.

The plenum pulsing system includes an accumulator air tank 44. An electric output pulse control valve 46 having an adjustable open or pulsing time is mounted atop the accumulator tank and a manual drain ball valve 48 is connected to the bottom of the accumulator tank 44 to allow the draining of moisture that may accumulate in the tank over time. An optional automatically controlled drain valve is shown at 50 in the fragmented view of FIG. 4B with street elbow drain fitting 52 that can be connected to a drain line, if desired. As shown in FIG. 4A, the accumulator air tank 44 is also connected to a source of high pressure air via a supply tube 54 connected to an adjustable pressure regulator 56 with associated gauge 58. The air supply system further includes a check valve 60, inlet shut-off ball valve 62 and a tube or pipe nipple 64 that connects to a high pressure tube or air hose (not shown) leading to a conventional air compressor connection (also not shown).

The accumulator air tank 44 is attached to the side wall of the filtration zone structure by a pair of mounting brackets 66 and air is delivered into the clean air plenum above the partition 28 through an air opening 68 (FIG. 3) using a length of pipe 100, having an upward beveled outlet opening 102, connected by a pipe union 104 to an output nipple 106.

FIG. 5 depicts an alternative or optional pressure measuring and switching system for the filter vent system of the invention. This system uses a preset threshold pressure differential or pressure drop across the filter units to signal the need for and possibly control operation of the pulsing system. The system, generally at 70, includes a pair of magnehelic gauges or pressure sensors 72, 74. These include a high pressure gauge 72 which is connected via conduit 76, coupling 78 and muffler 80 to measure the pressure in the main silo or other vessel cavity of interest upstream of the filtration units; and a low pressure gauge 74 connected via conduit 82, coupling 84 and muffler 86 to access and measure the pressure in the vent plenum 37. Further conduits 88, 90 connect high and low pressure lines respectively to housing 92 containing a conventional pressure switch (not shown). In this manner, the operation of the plenum pulsing system can be based or activated based on a pre-determined, preferably adjustable, pressure differential level or pressure drop across the filter units which indicates a corresponding amount of flow restriction.

Figure 6:
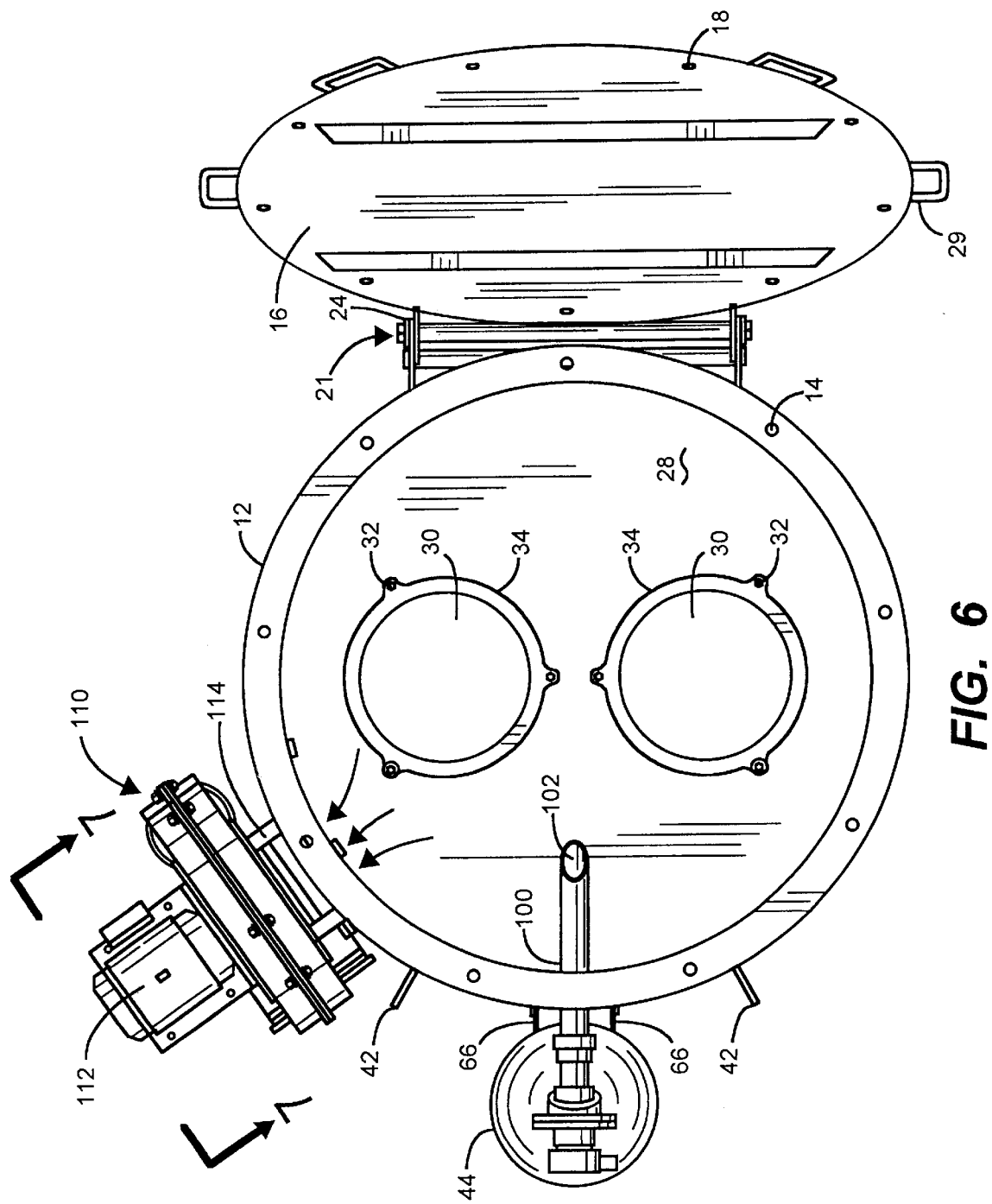
FIG. 6 is a top view of a filter vent system similar to that of FIG. 1, but including an exhaust blower.

FIG. 6 is a top view similar to FIG. 1 but including an exhaust blower 110 driven by a motor 112 and connect to a corresponding opening in the vent plenum 37 using an inlet boot 114. The blower assists in evacuating displaced air as the associated vessel is charged.

Figure 7:
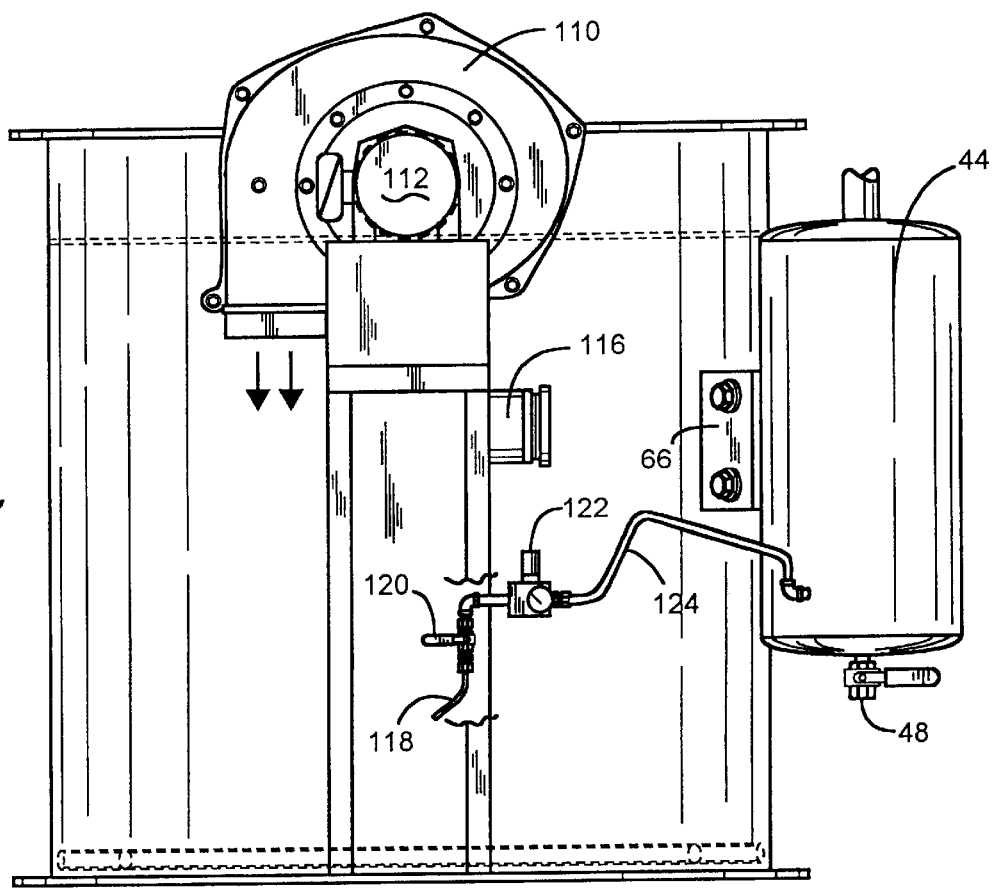
FIG. 7 is a side elevational view taken along lines 7—7 of FIG. 6.
Figure 8:
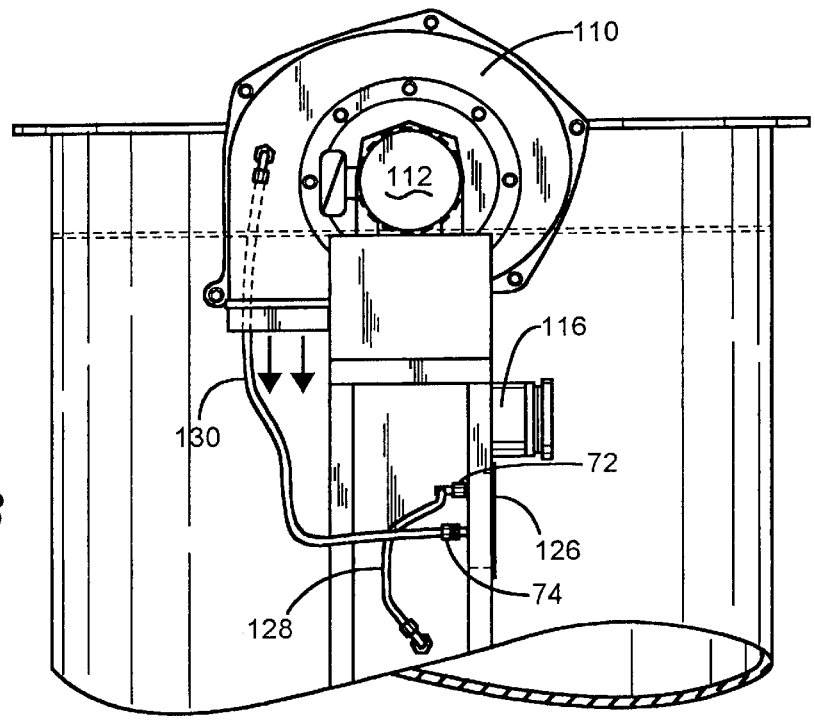
FIG. 8 is a fragmentary view of a portion of FIG. 7 depicting a pressure switch blower control.

As seen in the side elevational view of FIG. 7 and fragmentary view of FIG. 8, the blower is mounted in a down-blast arrangement. The junction box 116 is mounted below the blower as shown in FIGS. 7 and 8. The air inlet supply system for the accumulator tank 44, as shown, includes supply line 118, ball valve 120, a pressure regulator and gauge at 122 and connecting tube 124. A further magnehelic pressure gauge 126 may be provided with high pressure upstream input 128 and low pressure clean air plenum input 130. The pressure sensing system can be used as a source of information and/or control signals as previously described.

Figure 9:
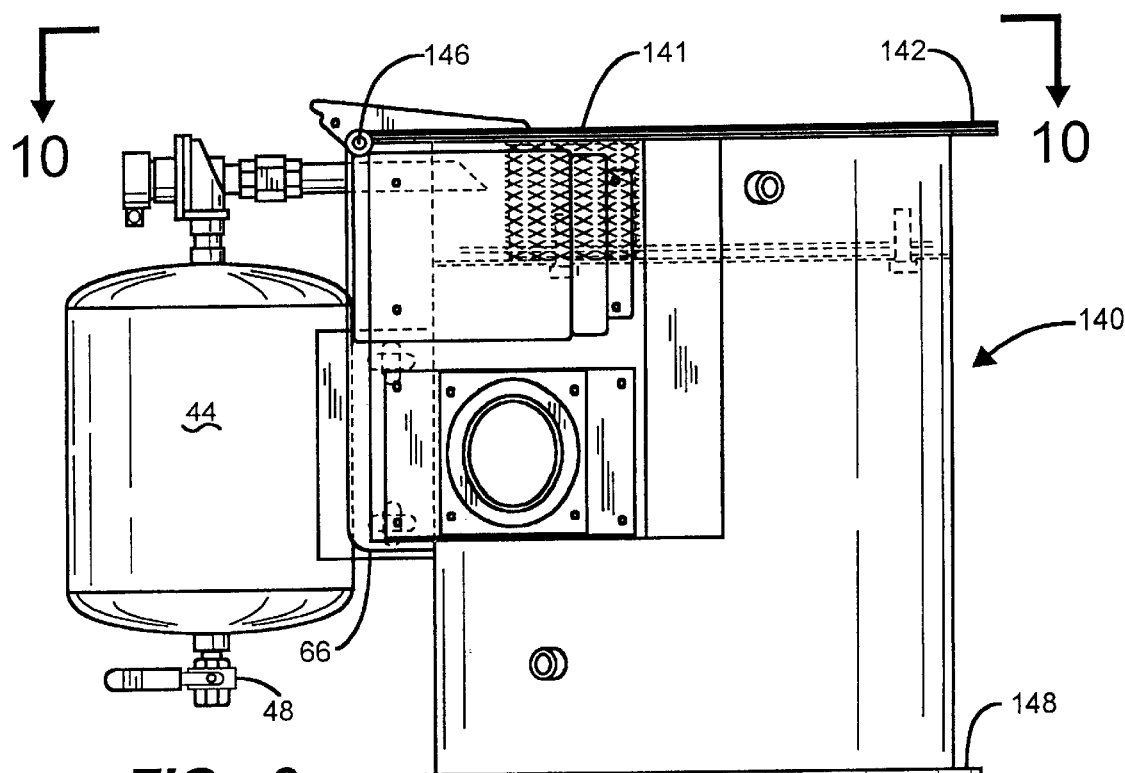
FIG. 9 is a side view of a filter vent system in accordance with the invention adapted for use in conjunction with a cement batching vessel.
Figure 10:
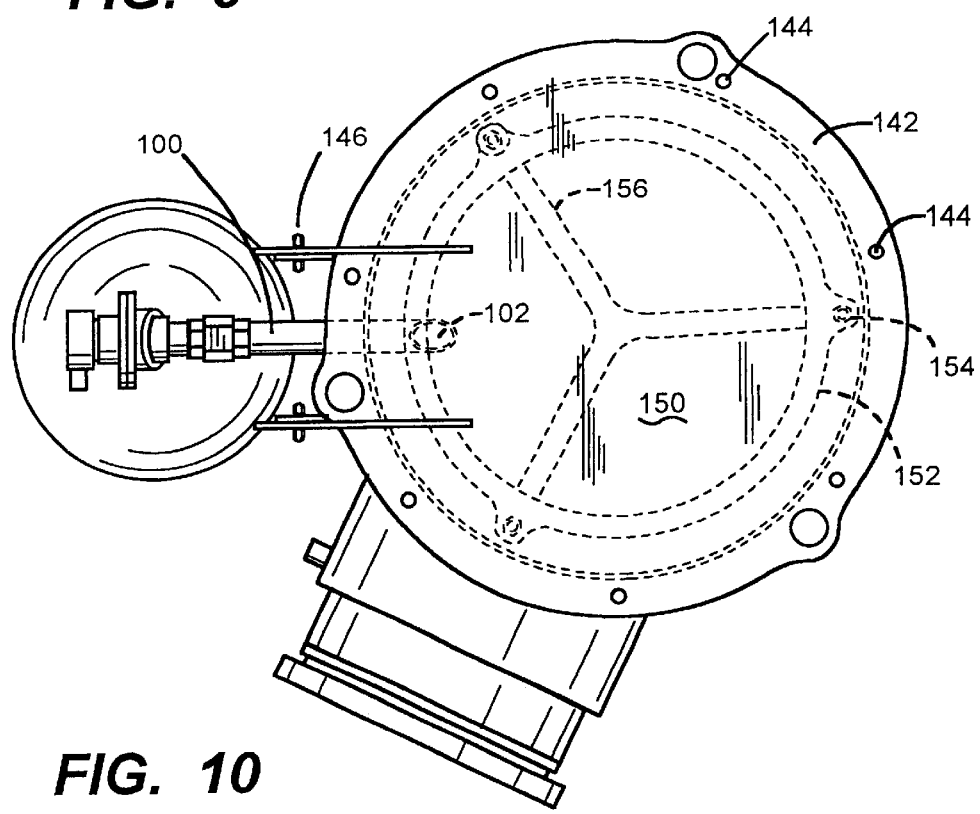
FIG. 10 is a top view taken along lines 10—10 of FIG. 9.

FIGS. 9 and 10 depict side elevational and top views of an alternate filter vent arrangement in accordance with the invention as applied to a weigh batching chamber of a cement plant. The system includes a cylindrical vessel section 140 which, as was the case with the embodiment illustrated in FIGS. 1–3, is in the form of filtration zone having an upper flange 142 in a door member 141 which can be bolted shut in a plurality of locations 144. The door panel or lid 141 is hinged at 146 in a manner similar to or identical to that described in relation to the embodiment of FIGS. 1–3. This likewise can be locked in the open position. Lower flange 148 is used to attach the modular filtration system to the cement batching vessel. The modular filtration system consists of a single filter unit 150 with retaining ring 152 held in place by a plurality of threaded fasteners as at 154. The lower safety retaining system for retaining falling filter cartridges is shown at 156.

The pulsing system and controls may be identical to those utilized in the cement silo embodiment of FIGS. 1–3 but may be of a modified size. Although not shown, an optional automatically controlled drain valve, such as that shown at 50 in the fragmented view of FIG. 4B, can be used in conjunction with the accumulator air tank 44 and, a pressure-operated switching system such as that shown in FIG. 5 can be implemented in this embodiment in the same manner. In addition, an exhaust blower system can be utilized in this embodiment as well as that shown in FIGS. 6–8.

FIGS. 11A–11D depict a variety of filter unit patterned arrangements from one containing two filters to one containing five filters at 178, 180, 182 and 184. Any of these and others can be used with the illustrated filtration zone.

The systems are designed for use with top loading pleated filter cartridges which can be of any size and number compatible with the filtration requirements of the particular silo or other vessel. Pleated filter cartridges used in one successful type embodiment were 12.75 inches (32.4 cm.) in diameter and 36 inches (91.4 cm.) long and having a surface area of 140 square feet (13.0 sq. m.). In this manner, a two-unit system would have 280 square feet (26.0 sq. m.) of filter surface and a five-unit system would present 700 square feet (65 sq. m.) of filter surface. The cartridges may be made of a washable or discardable filter medium.

The operation of the plenum pulsing is controlled by a conventional ON/OFF control switch connected to the control board through the junction box 40. Just prior to the time that a supply truck is unloaded into the silo and for a selected time, normally 20 minutes, after completion of the unloading operation, the plenum pulsing system is operated. Other selected times may be programmed with respect to other vessels. The control board is customarily preset at the factory to predetermined pulse duration and pulse interval settings, for example, the valve 46 may be open for an 80 ms pulse or "on time" and closed for a 120 second interval or "off time". The control board also provides for adjusting these settings as desired in a conventional manner. Also, the operation may be controlled or modified by the operation of a pressure switch and/or exhaust blower. Of course, the air pressure in the accumulator tank can also be adjusted by adjusting the pressure regulator 56. Thus, any pulse duration, inter-pulse interval and air pressure combination may be programmed that allows proper filter vent operation considering clean air plenum volume, filter element volume, area and silo volume.

An important aspect of the plenum pulsing concept of the present invention is the delivery of the pulse into the clean air plenum generally using a single nozzle to cause a spike in chamber pressure rather than blasting directly into several filter elements using a plurality of valves and nozzles. This causes the plenum pressure to rise abruptly affecting all filter elements at once and, while some of the pulsed air escapes through the vent opening 38, most escapes by briefly reversing the flow through the filter elements blasting back through the filter medium and removing particulate matter accumulated on the upstream side of the filter element material.

It will be appreciated that the single source horizontal plenum pulse inlet pipe also has the added advantage that it allows the clean air plenum volume clearance between the partition member 28 and the access door 16 to be reduced to a minimum thereby reducing the overall height requirement of the vessel. This makes it easier to load and unload filter element cartridges from the top of the filtration zone and reduces the overall height required to be climbed by workers.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A filter vent system for separating entrained particulate matter from a conveying fluid in a vessel for containing said particulate matter, the system comprising:
   (a) a filtration zone, including a common clean air plenum defined within said filtration zone upstream of a vent outlet by a filter-supporting partition structure;
   (b) a plurality of filter units carried by said partition structure, each said filter unit having a downstream side continuously open to said common clean air plenum and an upstream side on which said particulate matter collects; and
   (c) a plenum pulsing system including a source of high pressure air connected to direct air into said common clean air plenum for applying a burst of high pressure air to pulse the volume of said plenum generally on a periodic basis to clean all of said filter units generally at the same time by inducing common short term rapid back flow.

2. A filter vent system as in claim 1 wherein said plenum pulsing system includes an air source consisting of a single pulse pipe and control valve.

3. A filter vent system as in claim 1 further comprising a pulse control system for controlling pulse frequency and duration.

4. A filter vent system as in claim 2 further comprising a pulse control system for controlling pulse frequency and duration.

5. A filter vent system as in claim 1 wherein said plenum pulsing system further comprises a source of high pressure air connected to an accumulator tank.

6. A filter vent system as in claim 1 wherein all of said filter units are cylindrical cartridge filters.

7. A filter vent system as in claim 1 further comprising a hinged cover access on said clean air plenum and a device for locking said cover in an open position during removal and replacement of said filter units and wherein each said hollow filter unit is a cylindrical cartridge element designed to be dropped in and removed from above.

8. A filter vent system as in claim 1 further comprising pressure sensing system for measuring the pressure on both sides of said one or more filter units.

9. A filter vent system as in claim 8 further comprising switch device connected to an operator based on a selected pressure drop across said one or more filter units.

10. A filter vent system as in claim 9 wherein said switch device is connected to said pulsing system.

11. A filter vent system as in claim 1 further comprising an exhaust blower connected to assist in exhausting air from said clean air plenum to ambient.

12. A filter vent system as in claim 9 further comprising an exhaust blower connected to assist in exhausting air from said clean air plenum to ambient.

13. A filter vent system as in claim 12 wherein said switch device is connected to operate said exhaust blower.

14. A filter vent system as in claim 9 wherein said switch is connected to an output indicator.

15. A filter vent system as in claim 1 further comprising spaced bottom members in said filtration zone to prevent a filter cartridge from falling into a vessel.

16. A filter vent system as in claim 7 further comprising spaced bottom members in said filtration zone to prevent a filter cartridge from failing into a vessel.

17. A filter vent system as in claim 1 wherein said high pressure pulse uses air at a pressure of 75 PSI or greater.

18. A filter vent system as in claim 1 wherein the number of filter units is from 1–5.

19. A method of operating a filter vent system having a plurality of filter units having each upstream sides and having downstream sides which lead to a common vent outlet plenum comprising the step of applying a high volume burst of high pressure air to said common vent outlet plenum generally on a periodic basis sufficient to clean said filter units through rapid back flow.

20. A method as in claim 19 further comprising the step of adjusting the frequency and duration of said high volume pulse of high pressure air to optimize filtering efficiency.

21. A method as in claim 19 wherein said high pressure pulse uses air at a pressure of 75 PSI or greater.

22. A method as in claim 19 wherein the duration of said pulse is from about 40 to about 120 ms.

23. A method as in claim 19 including the step of employing an exhaust blower to assist in venting said outlet plenum.

24. A method as in claim 19 further including the steps of measuring the pressure at the upstream and downstream sides of said filter units and using the magnitude of the difference to control pulse frequency.

25. A method as in claim 23 further including the steps of measuring the pressure at the upstream and downstream sides of said filter units and using the magnitude of the difference to control pulse frequency.

* * * * *